United States Patent
Jeon

(10) Patent No.: US 6,484,086 B2
(45) Date of Patent: Nov. 19, 2002

(54) METHOD FOR DETECTING ROAD SLOPE AND SYSTEM FOR CONTROLLING VEHICLE SPEED USING THE METHOD

(75) Inventor: Yong-Won Jeon, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/991,727

(22) Filed: Nov. 26, 2001

(65) Prior Publication Data

US 2002/0087253 A1 Jul. 4, 2002

(30) Foreign Application Priority Data

Dec. 28, 2000 (KR) ........................................ 2000-83930

(51) Int. Cl.$^7$ ................................................ G06F 7/00
(52) U.S. Cl. ........................................... 701/93; 701/96
(58) Field of Search ................................ 701/1, 93, 94, 701/95, 96, 98, 51, 54, 55; 340/441, 425.5

(56) References Cited

U.S. PATENT DOCUMENTS

| 4,833,612 A | * | 5/1989 | Okuno et al. ................. 701/93 |
| 5,758,306 A | * | 5/1998 | Nakamura ................... 701/93 |
| 6,067,497 A | * | 5/2000 | Sekine et al. ................. 701/93 |
| 6,076,036 A | * | 6/2000 | Price et al. ................... 701/93 |
| 6,182,000 B1 | * | 1/2001 | Ohta et al. ................... 701/96 |
| 6,188,316 B1 | * | 2/2001 | Matsuno et al. ............ 340/441 |
| 6,199,001 B1 | * | 3/2001 | Ohta et al. ................... 701/51 |

* cited by examiner

Primary Examiner—Richard M. Camby
(74) Attorney, Agent, or Firm—Birch, Stewart, Kolasch & Birch, LLP

(57) ABSTRACT

Disclosed is a method for detecting road slope and a system for controlling vehicle speed using the method. The method comprises the steps of receiving input of road images from a camera; performing conversion of the road images into a bird's-eye view; extracting a plurality of lane markers from the converted road images; calculating a slope in the extracted lane markers; and calculating a slope in the road using a difference in value between the slopes. The system comprises a vehicle speed setting unit for establishing a target vehicle speed and outputting the same; a camera for obtaining road images and outputting the same; a drive state detecting unit having a plurality of sensors for detecting a vehicle drive state; an actuator unit for performing specific automatic controls of the vehicle; and a control unit for performing the method of the present invention to detect a road slope, and controlling the actuator unit according to road slope detection results such that the vehicle is maintained at the established speed.

12 Claims, 2 Drawing Sheets

METHOD FOR DETECTING ROAD SLOPE AND SYSTEM FOR CONTROLLING VEHICLE SPEED USING THE METHOD

BACKGROUND OF THE INVENTION (a) Field of the Invention

The present invention relates to a method for detecting road slope and a system for controlling vehicle speed using the method. More particularly, the present invention relates to a method for detecting a road slope using road image information provided by a camera, and to a system that performs vehicle speed control on the basis of whether a road slope has been detected.

(b) Description of the Related Art

An ever-increasing amount of electronic control is being used in vehicles to provide greater safety and convenience. Such electronic control is fully automatic and often entails various determinations of driving conditions, on the basis of which operation is performed. The ABS (anti-lock brake system), TCS (traction control system), and cruise control system are some common examples.

An important such determination of a driving condition is that of identifying an approaching upward or downward slope in the road. If an approaching slope in the road is not identified with the use of the cruise control system, for example, vehicle speed may fall well below the set speed in the case of an uphill slope and well above the set speed in the case of a downhill slope. That is, using the uphill example, without detection of the approaching slope in the road, no adjustments prior to the uphill slope are made such that the vehicle loses speed. Although the drop in speed is detected then compensated for, a substantial amount of time is often required to recover the set speed.

Conventional methods to detect a slope in the road include the use of instruments such as a level meter, G-sensor, etc. that are mounted to the vehicle to detect changes in the horizontal positioning of the vehicle, and include processes in which vehicle operation is detected and modeling of the vehicle operation is performed to determine if the vehicle is traveling on a slope in the road. However, in the case of the level meter, the instrument is expensive and responds slowly. The G-sensor, on the other hand, is error prone as a result of noise elements caused by shock received from the road. In vehicle modeling, the process of calculating variables used is complicated such that errors are often found in the calculated results.

SUMMARY OF THE INVENTION

The present invention has been made in an effort to solve the above problems.

It is an object of the present invention to provide a method for detecting a road slope using road image information provided by a camera, and to a system that uses the detected road slope for controlling vehicle speed.

To achieve the above object, the present invention provides a method for detecting road slope and a system for controlling vehicle speed using the method. The method comprising the steps of (a) receiving input of road images from a camera; (b) performing conversion of the road images into a bird's-eye view; (c) extracting a plurality of lane markers from the converted road images; (d) calculating a slope in the extracted lane markers; and (e) calculating a slope in the road using a difference in value between the slopes.

According to a feature of the present invention, the slope in the road is calculated by selecting two lane marker slopes of lane markers on opposite sides of the road, and calculating a difference in value between the slopes.

According to another feature of the present invention, in step (b) of conversion into a bird's-eye view, only data in a relevant area including left and right lane markers that define a lane are converted.

According to yet another feature of the present invention, the method further comprises the step of determining if a steering angle is within a predetermined range by receiving input from a steering angle sensor, wherein the steering angle determination may be performed before any of the steps (a)–(e), and wherein if it is determined that the steering angle falls outside the predetermined range, remaining steps of the method are not performed.

The system for controlling vehicle speed comprises a vehicle speed setting unit for establishing a target vehicle speed and outputting the same; a camera for obtaining road images and outputting the same; a drive state detecting unit having a plurality of sensors for detecting a vehicle drive state; an actuator unit for performing specific automatic controls of the vehicle; and a control unit for performing the above-described method of the present invention to detect a road slope, and controlling the actuator unit according to road slope detection results such that the vehicle is maintained at the established speed.

According to a feature of the present invention, the actuator unit includes a throttle valve actuator for controlling a throttle valve according to control signals received from the control unit, and wherein the throttle valve actuator is a step motor.

According to another feature of the present invention, the control unit, if it is determined that there is an approaching upward slope in the road, outputs a control signal to the throttle valve actuator such that an opening of the throttle valve is increased, and if it is determined that there is an approaching downward slope in the road, the control unit outputs a control signal to the throttle valve actuator such that the opening of the throttle valve is decreased.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
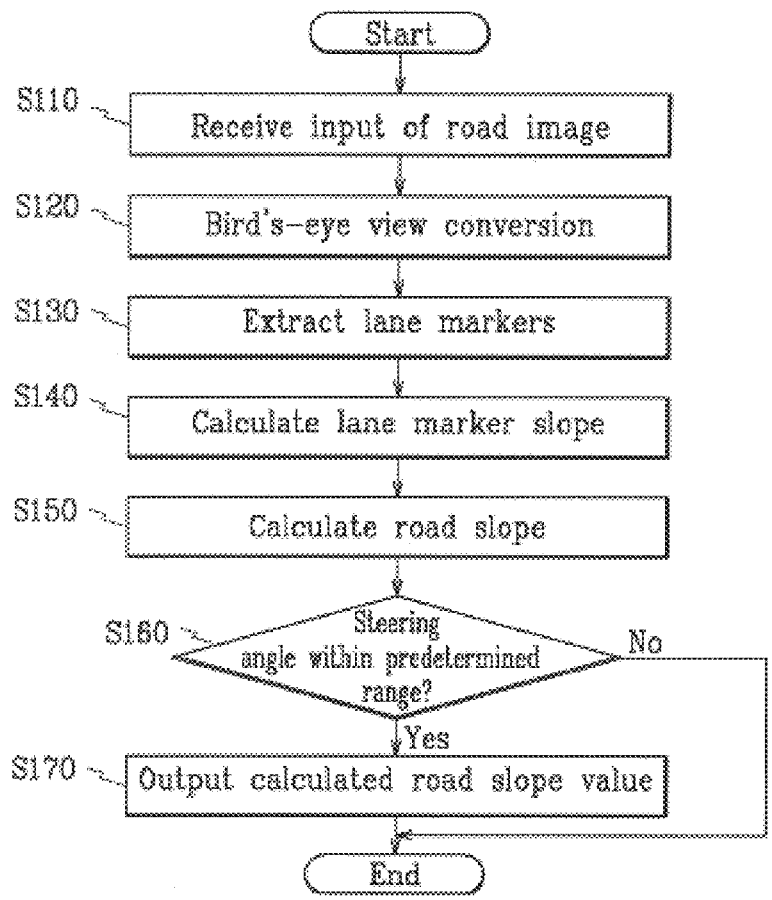
FIG. 1 is a flow chart of a method for detecting a road slope according to a preferred embodiment of the present invention.

FIG. 1 shows a flow chart of a method for detecting a road slope according to a preferred embodiment of the present invention.

The method for detecting a road slope may be performed by an arithmetic unit that is connected to a camera. The arithmetic unit is preferably a microprocessor, in which there is installed a program for performing the necessary calculations.

First, the arithmetic unit receives digital images that include road information from the camera in step S110. It is preferable that a closed-circuit camera (e.g., a CCD camera) is used. Also, the digital images may be received directly from the camera or after passing through an A/D (analog-to-digital) converter if the camera outputs analog images.

Figure 2:
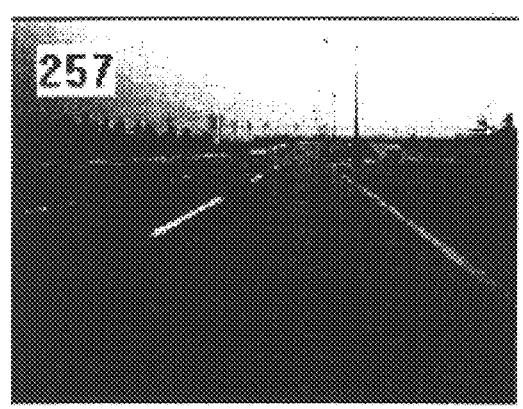
FIG. 2 is a road image before bird's-eye view conversion input from a camera.
Figure 3:
FIG. 3 is a road image after the image of FIG. 2 has undergone bird's-eye view conversion.

Next, the arithmetic unit converts the received road images into a bird's-eye view in step S120. In bird's-eye view conversion, the road images are converted into a planar view using the assumption that the information contained in the input road images are on the same level plane. Since such bird's-eye view conversion is a prior art technique, a detailed description thereof will not be provided. FIG. 2 shows a road image before bird's-eye view conversion input from the camera, and FIG. 3 shows the road image after undergoing bird's-eye view conversion.

In step S120 of performing bird's-eye view conversion, it is preferable that only data in a relevant area are extracted for conversion, that is, data contained within and including left and right lane markers that define a lane. A height of the relevant area may be established to a particular level following bird's-eye view conversion to enable inclusion of a slope.

Subsequently, the arithmetic unit extracts the lane markers from the converted road images (hereinafter referred to as "converted images") in step S130. One way in which this may be performed is by using the brightness of the lane markers. That is, since lane markers are brighter than the road surface, areas that have a higher brightness value than an established value are determined to be lane markers. Alternatively, the lane markers may be extracted by using a conversion ratio of brightness values, in which areas having extreme values are determined to be lane markers.

Following the extraction of the lane markers, the arithmetic unit calculates a slope in the lane markers in step S140. Since a plurality of lane markers is extracted in step S130, a plurality of slopes is calculated in step S140.

Next, after two lane marker slopes (of lane markers on opposite sides of the road) are selected and a difference in value between the slopes is calculated, this value is used to calculate a slope in the road (i.e., a road slope calculation value) in step S150. That is, if a distance between the two lane markers is decreased in a direction toward a top of the converted image, it is determined that there is a downhill slope in the road, while if this distance increases, it is determined that there is an uphill slope in the road.

After step S150, a steering angle input from a steering angle sensor is used to determine if the steering angle is within a predetermined range in step S160. This is used to determine whether the slope as calculated above is a valid detection. That is, if in step S160 it is determined that the steering angle is within the predetermined range (e.g., ±5°) and therefore that the vehicle is driving basically in a straight line, then the results of the road slope obtained above are determined to be valid. However, if it is determined that the steering angle is outside the predetermined range, since this is indicative of the vehicle making a turn or driving on a curved road, the results of the road slope obtained by the steps above are not determined to be valid.

If the steering angle is within the predetermined range in step S160, the road slope calculation value determined in step S150 is output in step S170. However, step S170 is not performed and the process ended if in step S160 it is determined that the steering angle is not within the predetermined range.

In the method to detect a road slope of the present invention described above, although lane markers are extracted from the images having undergone bird's-eye view conversion, it is possible to perform extraction of the lane markers from the road images received from the camera, then perform bird's-eye view conversion based on the extracted lane marker information. Further, although step S160 of determining whether the steering angle is within the predetermined range is performed following step S150, step S160 may be performed prior to this and any other previous step.

Figure 4:
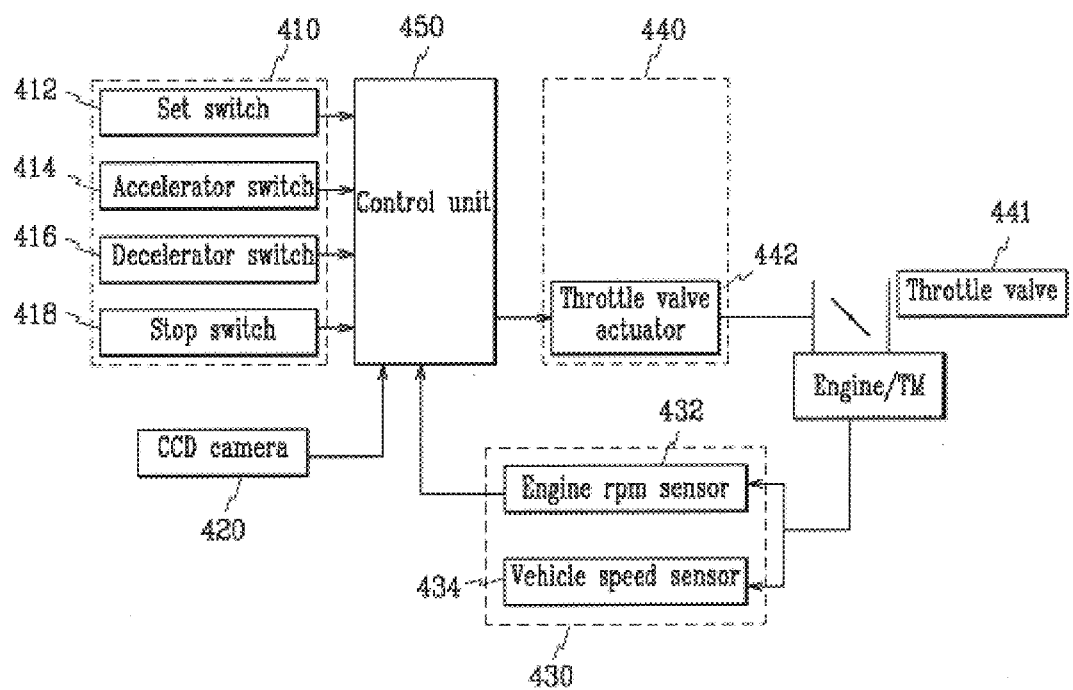
FIG. 4 is a block diagram of a system for controlling vehicle speed using the method of FIG. 1 according to a preferred embodiment of the present invention.

FIG. 4 shows a block diagram of a system for controlling vehicle speed using the method of FIG. 1 according to a preferred embodiment of the present invention.

The system for controlling vehicle speed includes a vehicle speed setting unit 410 for establishing a target vehicle speed and outputting the same; a camera 420 (e.g., a CCD camera) for obtaining road images and outputting the same; a drive state detecting unit 430 having a plurality of sensors for detecting a vehicle drive state; an actuator unit 440 for performing specific automatic controls of the vehicle; and a control unit 450 for performing the method for detecting a road slope of the present invention based on road images received from the camera 420, and controlling the actuator unit 440 according to detection results of the method of the present invention such that the vehicle is maintained at the established speed.

The vehicle speed setting unit 410 includes a set switch 412 for requesting the start of speed control, an accelerator switch 414 for requesting an increase in speed, a decelerator switch 416 for requesting a reduction in speed, and a stop switch 418 for requesting the discontinuation of the speed control. The drive state detecting unit 430 includes an engine rpm sensor 432 for detecting engine rpm, and a vehicle speed sensor 434 for detecting vehicle speed.

The actuator unit 440 includes a throttle valve actuator 442 for controlling a throttle valve 441 according to control signals received from the control unit 450. It is preferable that the throttle valve actuator 442 is a step motor. Also, it is preferable that the control unit 450 performs each step of the inventive method using a specific program. Accordingly, the control unit 450 receives road images from the camera 420, and if it is determined that there is an approaching upward slope in the road using the road slope detecting method of the present invention, controls the throttle valve actuator 442 such that an opening of the throttle valve 441 is increased. On the other hand, if it is determined that there is an approaching downward slope in the road, the control unit 450 controls the throttle valve actuator 442 such that the opening of the throttle valve 441 is decreased.

In the method for detecting a road slope and the system for controlling vehicle speed using the present invention described above, determinations of whether there is an approaching road slope are made by detecting a road slope using images obtained from a camera. Accordingly, precise determinations are performed using relatively simple equipment. Also, with the system utilizing this method, the set cruise speed can be uniformly maintained.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for detecting road slope comprising the steps of:

(a) receiving input of road images from a camera;
   (b) performing conversion of the road images into a bird's-eye view;
   (c) extracting a plurality of lane markers from the converted road images;
   (d) calculating a slope in the extracted lane markers; and
   (e) calculating a slope in the road using a difference in value between the slopes.

2. The method of claim 1 wherein the slope in the road is calculated by selecting two lane marker slopes of lane markers on opposite sides of the road, and calculating a difference in value between the slopes.

3. The-method of claim 1 wherein in step (b) of conversion into a bird's-eye view, only data in a relevant area including left and right lane markers that define a lane are converted.

4. The method of claim 1 further comprising the step of:
   determining if a steering angle is within a predetermined range by receiving input from a steering angle sensor,
   wherein the steering angle determination may be performed before any of the steps (a)–(e), and
   wherein if it is determined that the steering angle falls outside the predetermined range, remaining steps of the method are not performed.

5. A method for detecting road slope comprising the steps of:

(a) receiving input of road images from a camera;
   (b) extracting a plurality of lane markers from the converted road images;
   (c) performing bird's-eye view conversion of the images in which lane markers have been extracted.
   (d) calculating a slope in the extracted lane markers; and
   (e) calculating a slope in the road using a difference in value between the slopes.

6. The method of claim 5 wherein the slope in the road is calculated by selecting two lane marker slopes of lane markers on opposite sides of the road, and calculating a difference in value between the slopes.

7. The method of claim 5 wherein in step (c) of conversion into a bird's-eye view, only data in a relevant area including left and right lane markers that define a lane are converted.

8. The method of claim 5 further comprising the step of:
   determining if a steering angle is within a predetermined range by receiving input from a steering angle sensor,
   wherein the steering angle determination may be performed before any of the steps (a)–(e), and
   wherein if it is determined that the steering angle falls outside the predetermined range, remaining steps of the method are not performed.

9. A system for controlling vehicle speed comprising:
   a vehicle speed setting unit for establishing a target vehicle speed and outputting the same;
   a camera for obtaining road images and outputting the same;
   a drive state detecting unit having a plurality of sensors for detecting a vehicle drive state;
   an actuator unit for performing specific automatic controls of the vehicle; and
   a control unit for detecting a road slope, and controlling the actuator unit according to road slope detection results such that the vehicle is maintained at the established speed, wherein the detecting a road slope comprises:
   receiving input of road images from a camera;
   performing conversion of the road images into a bird's-eye view;
   extracting a plurality of lane markers from the converted road images;
   calculating a slope in the extracted lane markers; and
   calculating a slope in the road using a difference in value between the slopes.

10. The system of claim 9 wherein the actuator unit includes a throttle valve actuator for controlling a throttle valve according to control signals received from the control unit, and wherein the throttle valve actuator is a step motor.

11. The system of claim 10 wherein the control unit, if it is determined that there is an approaching upward slope in the road, outputs a control signal to the throttle valve actuator such that an opening of the throttle valve is increased, and if it is determined that there is an approaching downward slope in the road, the control unit outputs a control signal to the throttle valve actuator such that the opening of the throttle valve is decreased.

12. A system for controlling vehicle speed comprising:
   a vehicle speed setting unit for establishing a target vehicle speed and outputting the same;
   a camera for obtaining road images and outputting the same;
   a drive state detecting unit having a plurality of sensors for detecting a vehicle drive state;
   an actuator unit for performing specific automatic controls of the vehicle; and
   a control unit for detecting a road slope, and controlling the actuator unit according to road slope detection results such that the vehicle is maintained at the established speed, wherein the detecting a road slope comprises:
   receiving input of road images from a camera;
   extracting a plurality of lane markers from the converted road images;
   performing bird's-eye view conversion of the images in which lane markers have been extracted;
   calculating a slope in the extracted lane markers; and
   calculating a slope in the road using a difference in value between the slopes.

* * * * *